(12) United States Patent
Elbl et al.

(10) Patent No.: US 11,948,212 B1
(45) Date of Patent: Apr. 2, 2024

(54) CLASSIFICATION OF WILDFIRE DANGER

(71) Applicant: Cabrillo Coastal General Insurance Agency, LLC, Gainesville, FL (US)

(72) Inventors: John Elbl, Gainesville, FL (US); Eric Weibel, Gainesville, FL (US)

(73) Assignee: CABRILLO COASTAL GENERAL INSURANCE AGENCY, LLC, Gainesville, FL (US)

(*) Notice: Subject to any disclaimer, the term of this patent is extended or adjusted under 35 U.S.C. 154(b) by 2 days.

(21) Appl. No.: 17/121,515

(22) Filed: Dec. 14, 2020

Related U.S. Application Data

(60) Provisional application No. 62/948,153, filed on Dec. 13, 2019.

(51) Int. Cl.
| | |
|---|---|
| *G06Q 50/00* | (2012.01) |
| *G01V 99/00* | (2009.01) |
| *G06F 16/28* | (2019.01) |
| *G06F 17/18* | (2006.01) |
| *G06Q 10/067* | (2023.01) |
| *G06Q 30/0204* | (2023.01) |
| *G06Q 50/16* | (2012.01) |
| *G06Q 50/26* | (2012.01) |

(52) U.S. Cl.
CPC .......... *G06Q 50/16* (2013.01); *G01V 99/00* (2013.01); *G06F 16/285* (2019.01); *G06F 17/18* (2013.01); *G06Q 10/067* (2013.01); *G06Q 30/0205* (2013.01); *G06Q 50/26* (2013.01)

(58) Field of Classification Search
CPC .. G06Q 50/16; G06Q 10/067; G06Q 30/0205; G06Q 50/26; G01V 99/00; G06F 16/285; G06F 17/18

USPC ....................................................... 705/7.34
See application file for complete search history.

(56) References Cited

U.S. PATENT DOCUMENTS

| | | | |
|---|---|---|---|
| 2005/0203778 A1* | 9/2005 | Chen ...................... | G06Q 40/08 705/4 |
| 2007/0043662 A1* | 2/2007 | Lancaster .............. | G06Q 40/08 705/36 R |

(Continued)

FOREIGN PATENT DOCUMENTS

| | | | | |
|---|---|---|---|---|
| WO | WO-2021165972 A1 * | 8/2021 | ............. | A62C 35/64 |
| WO | WO-2021226605 A1 * | 11/2021 | ............... | A62C 3/02 |

OTHER PUBLICATIONS

TE/VS Proposed Project Fireshed Map, Aspen Environmental Group, 2011, 1 page.

(Continued)

*Primary Examiner* — Rutao Wu
*Assistant Examiner* — Tyrone E Singletary
(74) *Attorney, Agent, or Firm* — Haynes Beffel & Wolfeld LLP; Ernest J. Beffel, Jr.

(57) ABSTRACT

A method and system for modeling of physical phenomena associated with natural disasters, including prediction of damage caused by wildfire conflagration. Such modeling involves dividing a target land area into a set of regions and a set of structures that are located within the target land area, each of the regions and structures are characterized by various vulnerabilities to fire conflagration, and are scored and subject to execution of simulation and regression, and other types of mathematical representation and statistical inference to support human intelligence and decision making.

18 Claims, 8 Drawing Sheets

(56) References Cited

U.S. PATENT DOCUMENTS

| | | | | |
|---|---|---|---|---|
| 2011/0153368 | A1* | 6/2011 | Pierre | G06Q 10/067 |
| | | | | 705/4 |
| 2012/0311416 | A1* | 12/2012 | Richter | G01C 21/32 |
| | | | | 715/202 |
| 2014/0244318 | A1* | 8/2014 | Drake | G06Q 40/08 |
| | | | | 705/4 |
| 2015/0019262 | A1* | 1/2015 | Du | G06Q 40/08 |
| | | | | 705/4 |
| 2016/0055595 | A1* | 2/2016 | Green | G06N 5/048 |
| | | | | 705/313 |
| 2018/0336460 | A1* | 11/2018 | Tschemezki | G06N 3/0445 |
| 2021/0110691 | A1* | 4/2021 | Heinonen | G08B 31/00 |
| 2021/0271934 | A1* | 9/2021 | White | G06V 10/774 |
| 2021/0358049 | A1* | 11/2021 | Schwartz | A62C 3/02 |

OTHER PUBLICATIONS

Rosenberg et al, Analysis Options for Forest Carbon Inventory and Greenhouse Gas Life Cycle Assessment, Spatial Informatics Group, Jun. 2015, 100 pgs.

Sly et al, Modeling Fundamentals: What is AAL, AIR Wildfire AAR used in Micro-score, Mar. 23, 2013, 5 pgs (downloaded Jan. 3, 2023 from https://www.air-worldwide.com/publications/air-currents/2013/Modeling-Fundamentals-What-Is-AAL-/).

Sahh et al, Developing and Testing a Framework for Estimating Potential Emission Reduction Credits: a pilot study in Shasta County, Calforiam USA, Technical Report, Spatial Informatics Group LLC, Mar. 21, 2010, 42 pgs.

Community Wildfire Protection Plan, Nevada County, Fire Safe Council of Nevada County, Jun. 2008. 118 pgs.

Molly Mowery et al, Final Recommendations for Town of Mammoth Lakes, Wildfire Planning International, LLC, Oct. 31, 2018, 51 pgs.

Evidence-based Forest Management Strategies for Improved Wildfire Resilience, California Council on Science and Technology, Jun. 2019, 2 pgs (https://ccst.us/expert-briefings/).

Butte County Community Wildfire Protection Plan, California Department of Forestry & Fire Protection Butte Unit, Jan. 10, 2008, 73 pgs.

RZExposure, How We Model, Redzone.com, Jun. 21, 2020, 8 pgs (downloaded Dec. 6, 2022 from https://web.archive.org/web/20200621212016/https://www.redzone.co/how-we-model/).

Barren Ridge Renewable Transmission Project, Wildfire and Fuels Technical Report, Power Engineers, Inc., Jun. 2011, 136 pgs.

Community Wildfire Protection Plan, Nevada County, Fire Safe Council of Nevada County, Apr. 2016, 127 pgs.

Salis M, et al, Application of simulation modeling for wildfire exposure and transmission assessment in Sardinia, Italy, International Journal of Disaster Risk Reduction, vol. 58, May 2021, 16 pages.

Trucchia A. et al, PROPAGATOR: An operational cellular-automata based wildfire simulator, Fire, No. 3(3), Jul. 2020, 24 pages.

Bakhshaii, A. et al, A review of a new generation of wildfire-atmosphere modeling, Canadian Journal of Forest Research, No. 49(6), 2019, 10 pages.

Papadopoulos GD et al, A comparative review on wildfire simulators. IEEE systems Journal, vol. 5(2), Jun. 2011, 10 pages.

Finney MA et al, A simulation of probabilistic wildfire risk components for the continental United States, Stochastic Environmental Research and Risk Assessment, vol. 25, Oct. 2011, 28 pages.

Ager AA et al, Predicting Paradise: Modeling future wildfire disasters in the western US. Science of the total environment, vol. 784, Apr. 13, 2021, 15 pages.

* cited by examiner

| First Tier Region | Macro Fire Conflagration Score (MAFCS) Value |
|---|---|
| 230 | 3 |
| 232 | 2 |
| 234 | 4 |
| 236 | 2 |
| 238 | 4 |
| 240 | 3 |
| 233 | 2 |
| 244 | 1 |
| 246 | 2 |
| 248 | 1 |

$$AAL = A\underset{512}{x^2} + B\underset{514}{y}$$

AAL – Average Annual Loss
x – Macro Fire Conflagration Score (MAFCS)
y – Micro Fire Conflagration Score (MIFCS)
A – Constant coefficient for variable (x)
B – Constant coefficient for variable (y)

FIG. 5

CLASSIFICATION OF WILDFIRE DANGER

CROSS REFERENCE TO RELATED PATENT APPLICATION(S)

This document is a United States non-provisional utility patent application that claims priority and benefit to U.S. (utility) provisional patent application having Ser. No. (62/948,153), that was filed on Dec. 13, 2019, and that is entitled "CLASSIFICATION OF WILDFIRE DANGER AND FIREFIGHTING FOR DAMAGE TO STRUCTURES", and which is incorporated herein by reference in its entirety for all purposes.

FIELD OF THE INVENTION

The field of the invention involves modeling of physical phenomena associated with natural disasters, including prediction of damage caused by wildfire conflagration. Such modeling involves dividing a target land area into a set of regions and a set of structures that are each characterized by various vulnerabilities to fire conflagration, and which are scored and subject to execution of simulation and regression, and other types of mathematical representation and statistical inference to support human intelligence and decision making.

BACKGROUND OF THE INVENTION

A need has arisen to model the physical death and destruction caused by wildfires. The increasing prevalence of this physical phenomena in certain parts of the world, including portions of the state of California and the nation of Australia, has highlighted the need. The discussion above is merely provided for general background information and is not intended to be used as an aid in determining the scope of the claimed subject matter.

BRIEF DESCRIPTION

The subject matter of the technology disclosed includes a method and system of modeling physical phenomena that is associated with wildfire conflagration.

This brief description is intended only to provide a brief overview of subject matter disclosed herein. This brief description is not intended to identify key features or essential features of the claimed subject matter, nor is it intended to be used as an aid in determining the scope of the claimed subject matter.

BRIEF DESCRIPTION OF THE DRAWINGS

So that the manner in which the features of the technology disclosed can be understood, a detailed description of the technology disclosed may be had by reference to certain embodiments, some of which are illustrated in the accompanying drawings. The drawings are not necessarily to scale, and the emphasis generally being placed upon illustrating the features of certain embodiments of the technology disclosed. In the drawings, like numerals are used to indicate like parts throughout the various views. For further understanding of the invention, reference can be made to the following detailed description, read in connection with the drawings in which:

FIG. 3 is a table listing a macro fire conflagration score (MAFCS) value for each of the first tier regions of FIG. 2, from simulation.

FIG. 5 illustrates a regression model of a mathematical relationship between an average annual loss (AAL) variable, and a macro fire conflagration score (MAFCS) variable, and a micro fire conflagration score (MIFCS) variable.

DETAILED DESCRIPTION

Figure 1:
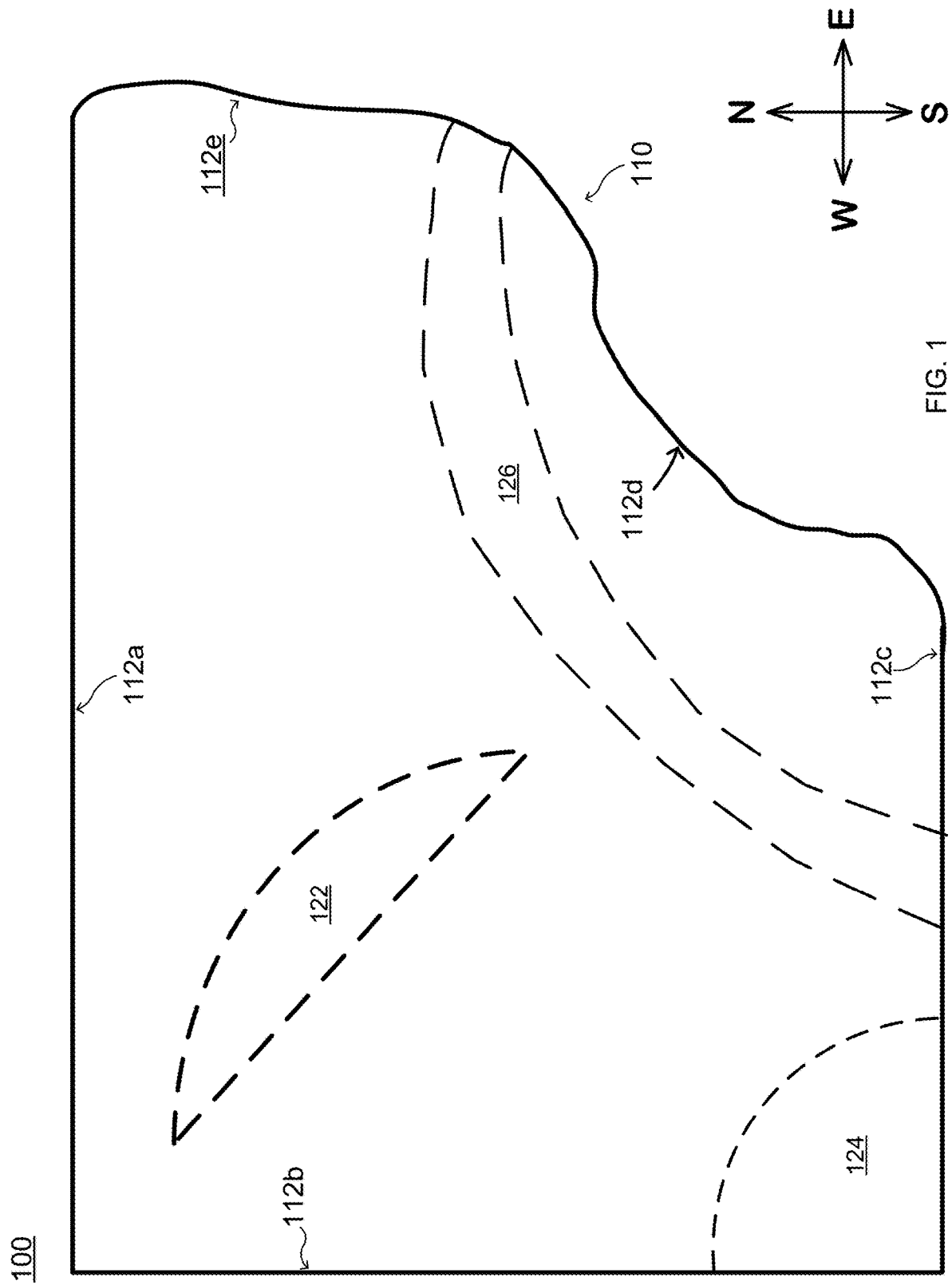
FIG. 1 illustrates an example and simplified representation of a target land area including a plurality of sections, each section having particular characteristics with respect to fire conflagration that are described in inputs to a Monte Carlo simulation model.

FIG. 1 illustrates an example and simplified representation 100 of a target land area 110 including a plurality of sections, each section having particular characteristics with respect to fire conflagration that are described in inputs to a Monte Carlo simulation model. A size of the target land area can range widely from tens, hundreds, thousands or even tens of thousands of square miles.

The term "fire conflagration" generally refers to a large and destructive fire. However, the term "fire conflagration" can also refer to movement of a fire across a landscape. A landscape that includes an abundance of dry and combustible vegetation, typically accommodates ignition and/or movement of a fire across that landscape. This type of landscape is referred to as having a propensity for fire conflagration, which can be described in simulation inputs or used for expert analysis. USGS maps describe landscape in a consistent coding that can be used as simulation input.

As shown, the target land area 110 resides within boundaries 112*a*-112*e* and includes sections of land that possess a low (negligible) fire conflagration likelihood. These sections of land of low conflagration likelihood include a highly elevated portion of a mountain range 122, a dry desert area 124 and a river 126 that each reside within the boundaries 112*a*-112*e* of the target land area. The different areas are coded differently for purposes of Monte Carlo simulation.

As simulation inputs, the highly elevated portion of the mountain range 122 is classified as being elevated above a timberline (tree line) 122*a*. The timberline 122*a* is a line above which no substantial amount (density) of vegetation grows. As a result, a landscape above a timber line consists of substantially soil and rocks. Generally a timberline resides between 10-13 thousand feet above sea level, depending upon where in the world the timberline is located. Such a landscape 122 that is located above a timberline generally resists and acts as a barrier to movement to a fire conflagration.

The desert 124 consists mostly of sand and rocks and lacks any significant amount of combustible vegetation, and as a result, resists and acts as a barrier to fire conflagration. Likewise, the river 126 has a width of at least two miles throughout the target area. The river 126 consists of either flowing and/or frozen water (ice) depending on the time of the year. As a result, the river 126 also acts as a barrier to fire conflagration.

Figure 2:
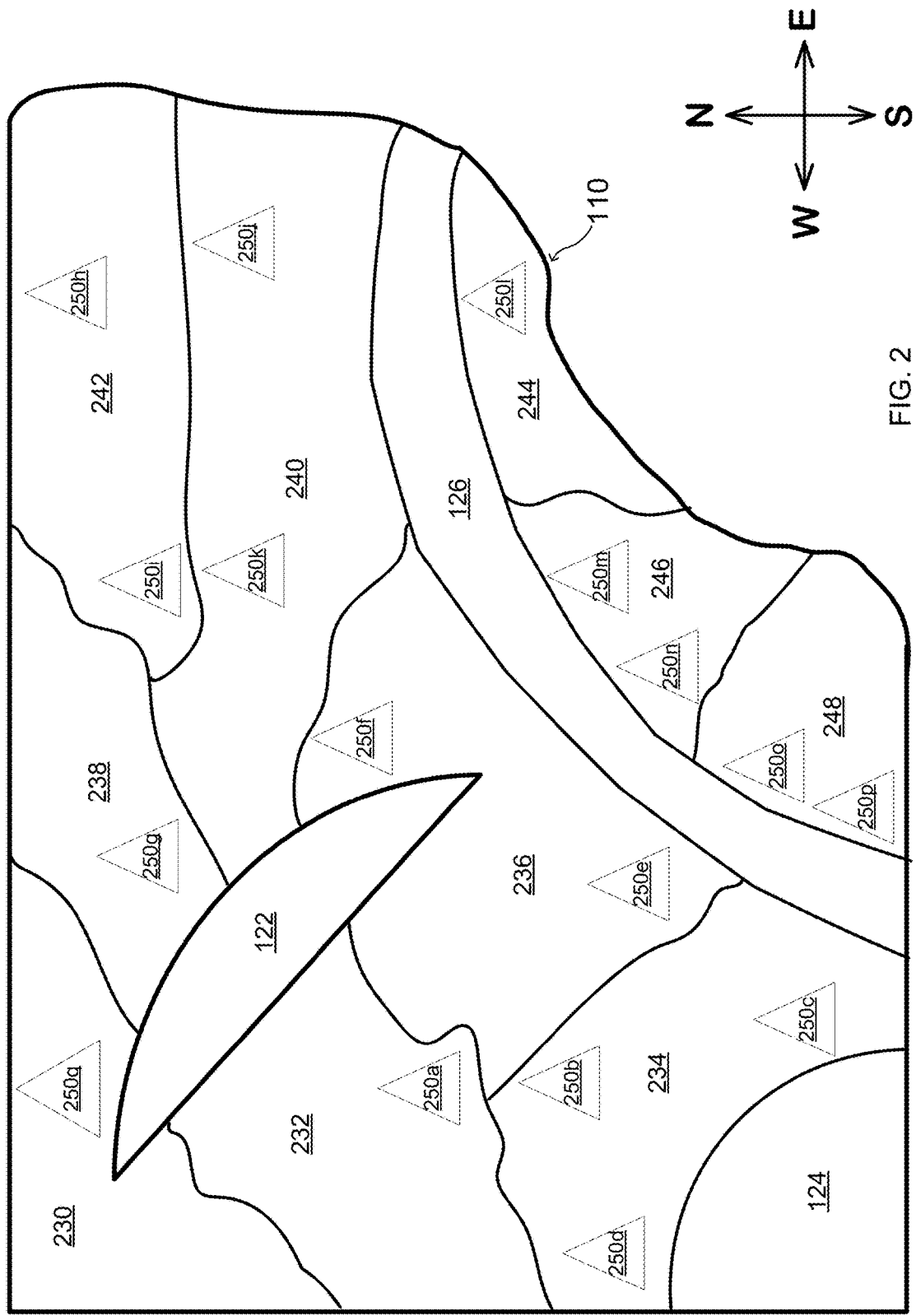
FIG. 2 illustrates the target land area of FIG. 1 being divided into a set of first tier regions, based on results of Monte Carlo simulation, each first tier region possessing fire conflagration characteristics represented by a macro fire conflagration score (MAFCS) value.

FIG. 2 illustrates the target land area of FIG. 1 being divided, based on results of Monte Carlo simulation results, into a set of first tier regions 230-248, each first tier region possessing fire conflagration characteristics represented by a first tier fire conflagration classification (cabclass) value, also referred to as a macro fire conflagration score (MAFCS) value. This can be done manually, by constructing a Voronoi diagram using an algorithm for subdividing an area, for instance, as discussed in the Wikipedia article, or by using another graph partitioning algorithm.

Each first tier region is a portion of land that falls within a range of characteristics that are associated with fire conflagration. The macro fire conflagration score (MAFCS) value represents a propensity of a particular first tier region to accommodate ignition and/or movement of fire, in accordance with a set of fire conflagration characteristics of that particular first tier region. The MAFCS score can be assigned based on results of a Monte Carlo simulation or it can be estimated from USGS maps and expert knowledge of regional fire fighting capabilities.

The macro characteristics that affect a propensity for a first tier region to accommodate fire conflagration include, geography of the first tier region, the amount, density and distribution of combustible vegetation, the location and size of non-combustible areas, such as bodies of water, the amount, density and distribution of other combustible and non-combustible material, such as the presence and density of man-made structures such as housing developments and parking lots for example, in addition to climate characteristics, atmospheric moisture, wind patterns and land surface topography, etc.

In one embodiment, the first classification variable is permitted to have one of four (4) values with respect to a severity of fire conflagration. These four values are integer values, being the integers (1, 2, 3, 4). A value of one (1) representing a lowest (least severe) propensity for fire conflagration, and a value of four (4) representing a highest (most propensity) propensity for fire conflagration.

Optionally, a simulation step can be programmed and/or parameterized to operate within particular constraints. For example, it has been observed that fire conflagration events of higher severity, can and often occur with a lower frequency over period of time, in relation to other fire conflagration events of lower severity, during that same period of time. Optionally, for example, fire conflagration events of higher severity can be filtered in, while fire conflagration events of lower severity can be filtered out, during a simulation step, to yield simulation output data that is more influenced by fire conflagration events of higher severity. Also note that the normalization of data can be used to filter out events of lower severity.

FIG. 3 is a table listing of a macro fire conflagration score (MAFCS) value for each of the first tier regions of FIG. 2, from simulation in this example. As shown, there are ten (10) first tier regions. Two of these first tier regions (234, 238) are assigned the highest fire conflagration classification value equal to a value of four (4). Another two of these first tier regions (230, 240) are assigned the second highest fire conflagration classification value equal to a value of three (3). Another four of these first tier regions (232, 236, 242 and 246) are assigned the second lowest fire conflagration classification value equal to a value of two (2). And two of these first tier regions (244, 248) are assigned the lowest classification value equal to a value of one (1).

Note that the fire conflagration classification values are scores which are unit less and scaled between the integers 1 through 4. As a general pattern, fire conflagration classification values are higher and ranging between the values of 2-4 for the first tier regions that are located to the north and west of the river 126. The fire conflagration classification values are lower and ranging between the values of 1-2 for the first tier regions that are located to the south and east of the river 126.

Figure 4:
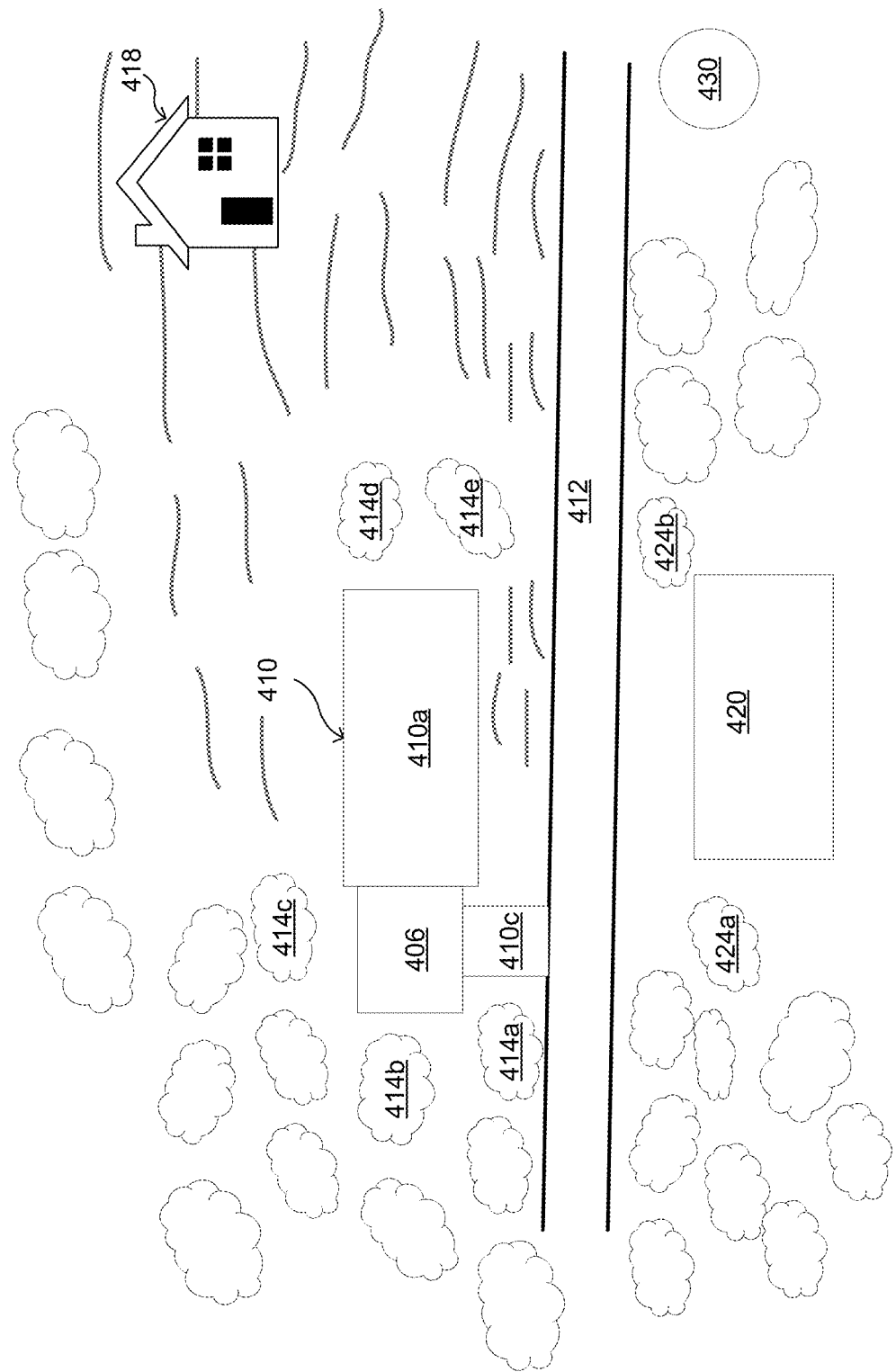
FIG. 4 illustrates a plan view of a structure and its surrounding area having fire conflagration characteristics that can be input to the simulation to produce a micro fire conflagration score (MIFCS) value.

FIG. 4 illustrates a plan view of a structure and its local surrounding area having fire conflagration characteristics that can be input to a simulation to produce a micro fire conflagration score (MIFCS) value.

As shown, a structure 410 includes a main house 410a and an attached garage 410b, that reside upon a parcel of land. A shed is also located upon the parcel of land 418. The structure is accessible from a paved road 412 that is maintained by a local public municipality. The paved driveway 410c is located between the paved road 412 and the garage 410b.

Within a 10 foot distance of the structure, a plurality of trees 414a-414e are located. Another structure 420 is located on an opposite side of the road 412. Within 10 feet of the other structure 420, a plurality of two (2) trees 424a-424b are also located. A fire hydrant 430 is located on the same side of the road 412 as the structure 420 and located about 250 feet away from the structure 410.

Fire conflagration characteristics that are associated with the micro fire conflagration score (MIFCS), are characteristics of a structure and its local surrounding area and of its circumstances that are relevant to vulnerabilities and defenses to fire conflagration. These characteristics include geography that is local to the structure and its local surrounding area, road access to and distance from the road to the structure, an amount and type of vegetation near to and around the structure, location of combustible and non-combustible material near and around the structure, proximity to a fire hydrant, proximity to and capabilities of fire-fighting organizations that are expected to intervene to fight a fire conflagration threat to that particular structure, for example.

These characteristics are encoded for simulation, individually or collectively, and reflected in a micro fire conflagration score derived from the simulation. In one embodiment, the micro fire conflagration score is permitted to have one of fifty (50) values with respect to a vulnerability to fire conflagration. These fifty values are integer values, being the integers (1, 2, . . . through and including 50). A value of one (1) representing a lowest (least) vulnerability to fire conflagration, and a value of four (50) representing a highest (most vulnerability) to fire conflagration. An MIFCS is also referred to herein as a riskscore.

In some embodiments of the technology disclosed, online accessible simulation software and services are employed to determine a macro fire conflagration score (MAFCS) value and a micro fire conflagration value (MIFCS), for one or many structures.

In some embodiments, wildfire simulation and modeling software provided by Red Zone of Boulder, Colorado is employed to obtain fire score and fire spread coefficient information to determine a macro fire conflagration score at various locations. Spatial discontinuities of fire score information can be employed to determine boundaries between first tier regions and to set a macro fire conflagration score value for each first tier region. Also, wildfire modeling software provided by AIR of Boston, Massachusetts can be employed to obtain hazard score information in associated with a structure to determine a micro fire conflagration score for one or more structures.

Notional structures for input to the simulation can be readily obtained from a variety of data sources. Notional structures can be entirely hypothetical, or notional structures can reflect real structures that are located at real street addresses. An online real estate information service, for example, can be employed to gather information about real structures that are located at real street addresses.

FIG. 5 illustrates a regression model of a mathematical relationship between an average annual loss (AAL) variable, and a combination of a macro fire conflagration score (MAFCS) variable, and a micro fire conflagration score (MIFCS) variable. The average annual loss (AAL) represents an expected amount of damage suffered by a particular structure at a particular location during a one year period of time.

The AAL for a particular structure can be predicted based upon an equation including a macro fire conflagration score (MAFCS) variable value (x) and a micro fire conflagration score (MIFCS) value (y), and that are associated with the particular structure.

An average annual loss (AAL) can be predicted and modeled by a regression equation 510. The equation 510 represents AAL as being a variable that is a function of a combination of both a macro fire conflagration score (MAFCS) variable value (x) and of the micro fire conflagration score (MIFCS) variable value (y).

The equation shown 510 includes a first term 512 and a second term 514. The first term 512 multiplies a constant coefficient (A) times the square of the MAFCS variable (x), being the square of the macro fire conflagration score value. The second term 514 multiplies a constant coefficient (B) times the MIFCS variable (y).

The A and B coefficients can be determined via performing a regression analysis between each AAL value and its associated MAFCS (x) and MIFCS (y) value pair. To perform regression analysis, AAL values are obtained and processed in association with associated MAFCS (s) and MIFCS (y) value pairs.

A set of AAL values can be obtained for a set of particular structures in combination with other information that is associated with each of the particular structures, using the Red Zone (RZ) Natural Disaster Intelligence software. The other information obtained facilitates determination of a MAFCS and MIFCS value pair for each particular structure, residing at a location during a period of time.

Also note that Red Zone provides an application programming interface (API) which enables data to be transferred into and out of Red Zone via a software application program. This also enables a software application program to interface with and control simulation via the applications programming interface (API).

Each grouping of values, where each value of the group includes an AAL, a MAFCS and a MIFCS value, is associated with each particular structure, at a location during a period of time. A grouping of these three (3) values, being an AAL, a MAFCS value and an MIFCS value in combination, are also referred to herein as an AAL tuple or as a tuple, in association with the particular structure, which is also referred to herein as a notional structure.

Note that an AAL is expressed as a number that is an expected monetary loss for a structure during a simulated year. As referred to herein, the AAL is a value that is expressed as an annual expected loss in dollars. For example, referring to the structure 410 of FIG. 4, if hypothetically, the shed 418 was assigned a value of $5,000, and that shed 418 caught fire and suffered damage to an extent of a total loss, then the loss for the owner of the shed, would be $5,000 in one (simulated) year. The AAL for that shed in that one (simulated) year would be assigned a value equal to $5000.00.

The regression process generally involves obtaining and processing a large amount of AAL tuple data. A plurality of AAL tuple points can be graphically represented and a best fit equation (curve) is fitted among the AAL tuple points to determine a best fit equation for the AAL tuple data. A best fit equation determines particular values for each of the A constant coefficient and the B constant coefficient. The accuracy of the best fit equation (curve) is enhanced by minimizing a least square or other appropriate fitting of the equation.

Figure 6A:
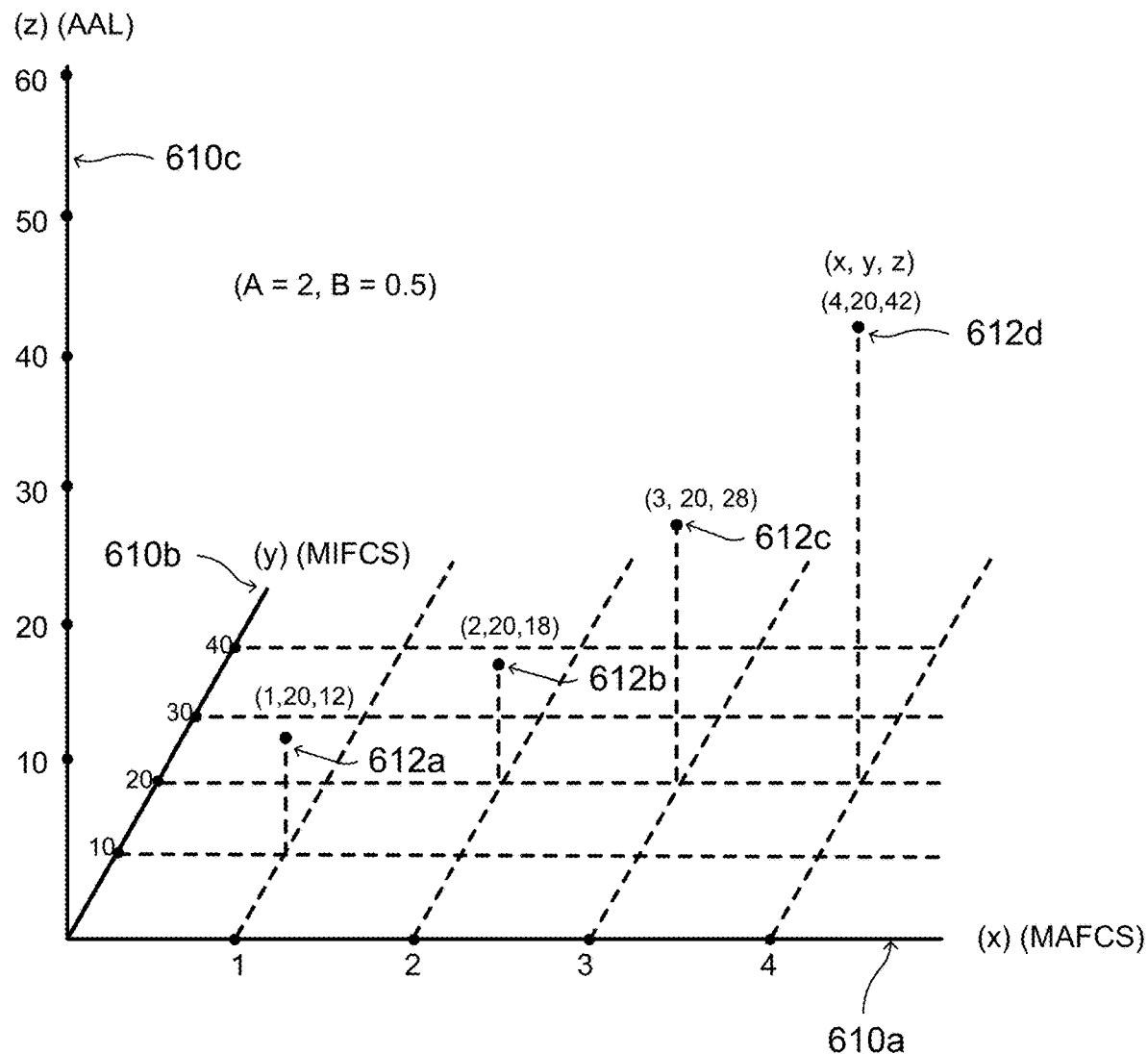
FIGS. 6A-6B illustrate a graphic representation of a regression result for an average annual loss (AAL) equation of FIG. 5.
Figure 6B:
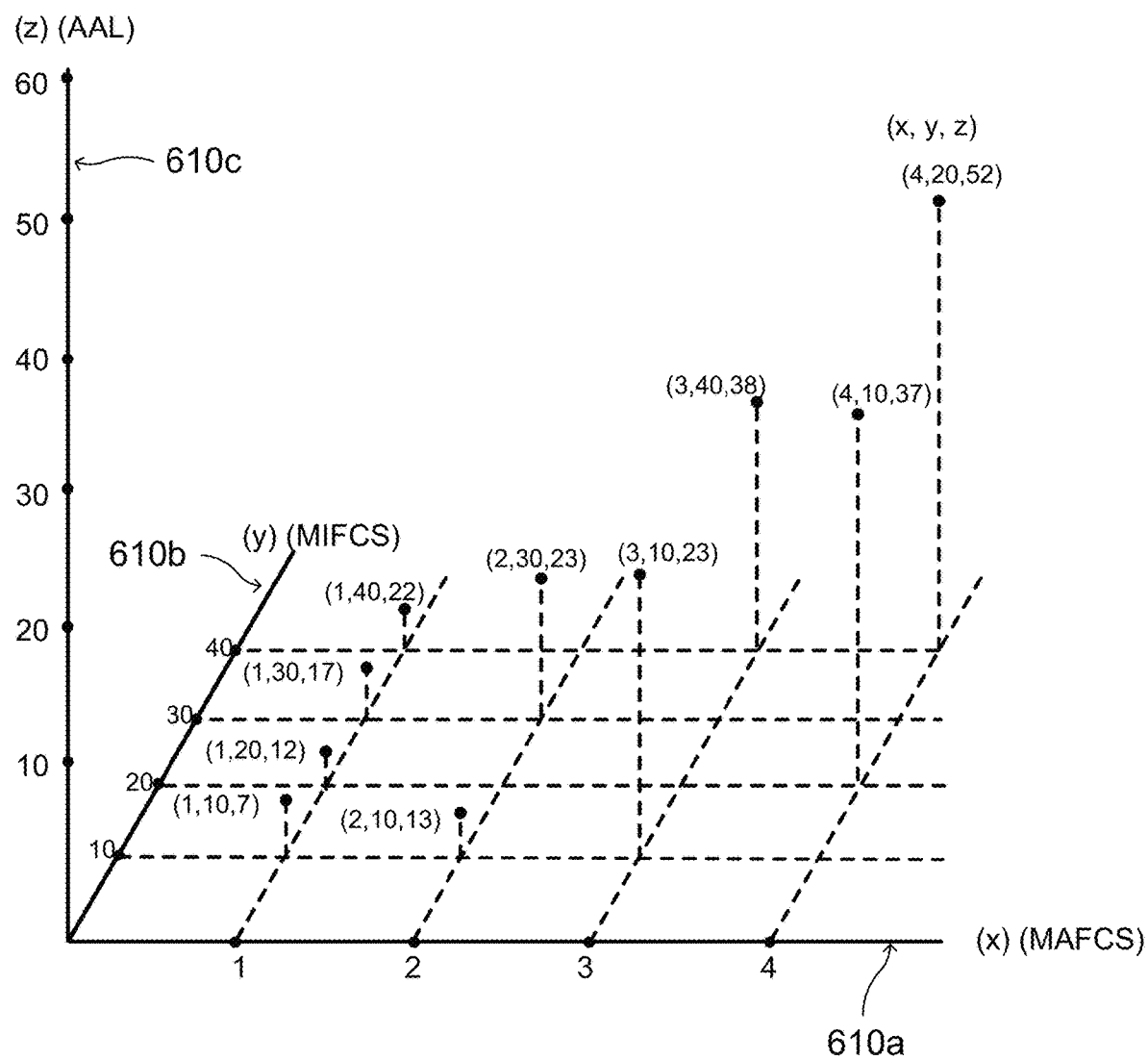

FIGS. 6A-6B illustrate a graphic representation of the average annual loss (AAL) output (z axis) of the equation 510 of FIG. 5, as a function of each pair of MAFCS and MIFCS values (x and y axes respectively).

Figure 7:
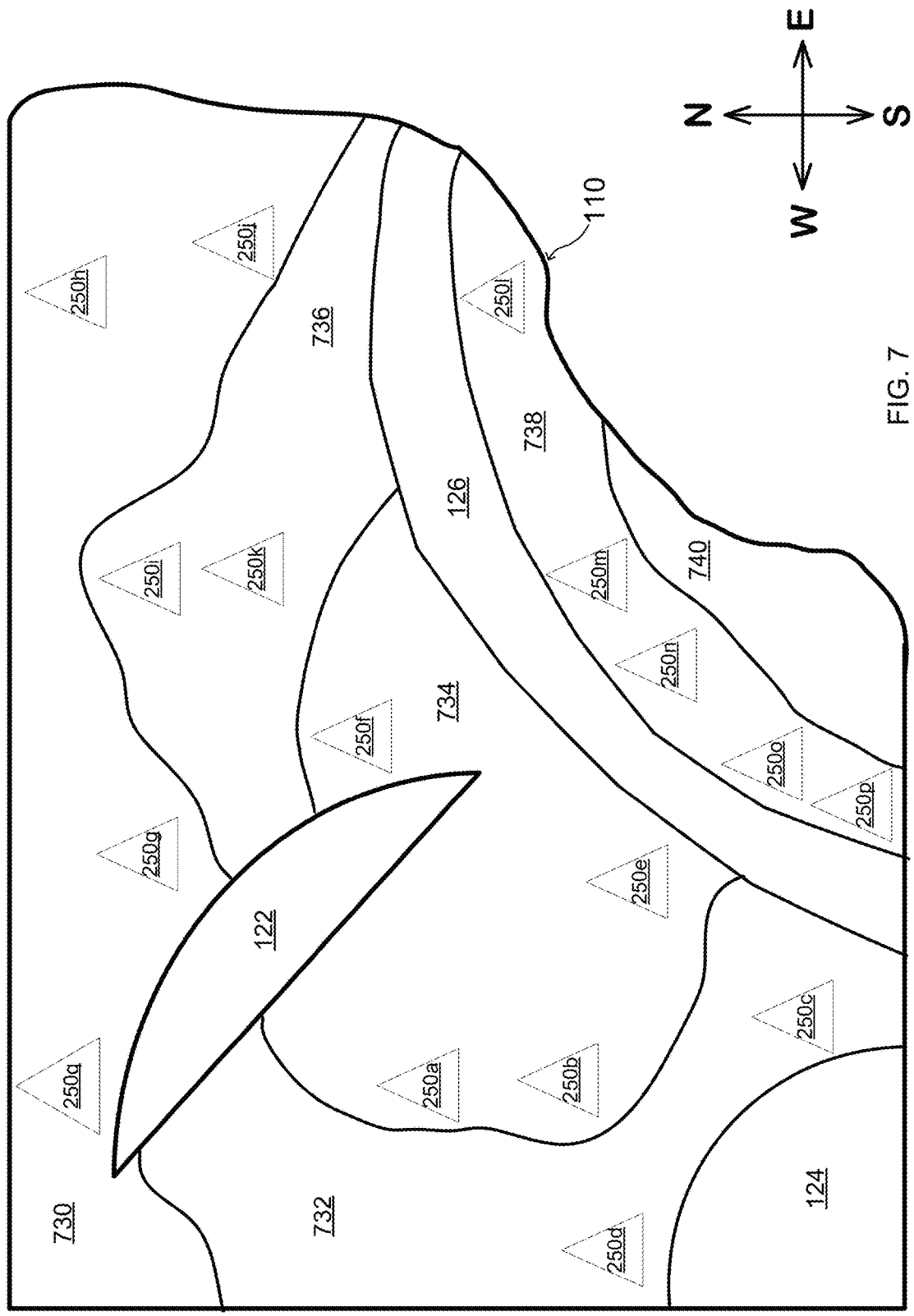
FIG. 7 illustrates the target land area of FIG. 1 being divided into a set of second tier regions, based on regression results after simulation, in which each second tier region has boundaries that are different from the boundaries of the first tier regions of FIG. 2.

FIG. 7 illustrates a simplified representation 700 of the target land area 110 of FIG. 1 being divided into a set of second tier regions 730-740, based on regression results after simulation, each second tier region 730-740 having boundaries that are different from the boundaries of the first tier regions 230-248 of FIG. 2. The boundaries of the second tier regions reflect, at least from spatial discontinuities of AAL values that are each associated with one of the structures residing within the target land area. Boundaries of the second tier regions can be determined, as above, by producing a Voronoi diagram, applying an area partitioning algorithm, or manually from simulation results.

Note that each AAL value reflects a combination of the macro fire conflagration score (MAFCS) and the micro fire conflagration score (MIFCS) derived from the prior simulation and/or analysis. For example, a dense housing development could influence the simulation results and the micro fire conflagration score (MIFCS) for an individual structure residing within the housing development.

For example, a dense housing development that is substantially made from combustible material, could raise an MIFCS value associated with a structure that is located within that dense housing development, or on the other hand, the making of the dense housing development from modern fire proof construction could reduce an MIFCS value relative to a structure that is located in that housing development.

Also for example, modern fire proof construction could reduce or limit an MIFCS value for a single standalone structure that is surrounded by highly combustible *Eucalyptus* trees. Raising an MIFCS value for a structure raises the associated average annual loss (AAL) value for that structure, while lowering the MIFCS value for that structure reduces the associated annual average loss (AAL) for that structure.

As shown in FIG. 7, the second tier regions 730-740 derived from the simulation can be larger and less numerous than the first tier regions of FIG. 2. Conversely, the second tier regions can be smaller and more numerous than the first tier regions of FIG. 2.

In some embodiments of the technology disclosed, these second tier region boundaries used for regression analysis are further adjusted for reasons other than or in addition to the discontinuities associated with the spatial distribution of the AAL values.

For example, if analysis of aerial vegetation maps indicates a line of discontinuity in a type and/or amount of vegetation that coincides with a line of discontinuity of AAL values produced by simulation, then the second tier boundaries can be further adjusted before regression analysis to more accurately follow the line of discontinuity of vegetation. A similar adjustment can be made for a discontinuity of AAL values with respect to a physical location of man-made development. This type of adjustment is also referred to herein as a visual spectrum adjustment or simply as a visual adjustment to the boundaries of a second tier region. This type of adjustment can compensate for placement of a limited number (low spatial density) of structures at a physical location within the simulation model.

Assignment of structures 250a-250b to a second tier region after simulation, in FIG. 7, further assigns each structure to a second tier region in addition to that same structure continuing to be (prior) assigned to a first tier region. Such further second tier region assignment does not physically move any of the structures within the target land area 110.

For example a group of three structures 250b-250d, are assigned to one same first tier region 234, as shown in FIG. 2. However, that same group of structures 250b-250d are not all further assigned to one same second tier region, as shown in FIG. 7. Although the structures 250c and 250d are further assigned to one same second tier region 732, the structure 250b is instead further assigned to another second tier region 734. Also note that the reverse can be true, meaning that a group of structures that are not all assigned to one same first tier region 250a-250b and 250e, as shown in FIG. 2, can be further assigned to one same second tier region 734, as shown in FIG. 7.

During development, it was observed that creating second tier regions after simulation and performing regression to fit the model within second tier regions produced a more accurate mathematical model. The accuracy of the model can be enhanced by applying a least square regression or applying another fitting analysis within second tier regions derived from simulation results. Per-region regression coefficients are calculated.

For example, per-tier two region regression analyses are performed for simulation results over all of the structures that are located within the target land area 110; six (6) separate regressions are performed to fit data in the six (6) second tier regions 730-740, yielding six (6) sets of MAFCS (x) and MIFCS (y) coefficient value pairs.

This written description uses example embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

PARTS LIST 100 simplified representation of target land area of FIG. 1
110 target land area
112 boundaries of target land area
122 highly elevated portion of the mountain range
124 desert
126 river
230-248 first tier regions of FIG. 2
250 structures of FIG. 2
410 structure of FIG. 4
412 paved road of FIG. 4
414 trees of FIG. 4
418 shed of FIG. 4
420 another structure of FIG. 4
424 trees of FIG. 4
430 fire hydrant of FIG. 4
510 equation (AAL) of FIG. 5
512 first term of equation
514 second term of equation
610a-610c x, y, z axes
612a-612d AAL data points
700 simplified representation of target land area of FIG. 7
730-740 second tier regions of FIG. 7

The invention claimed is:

1. A computer-implemented method of simulating of wildfire conflagration damage to structures assigned to regions within an area, including Monte Carlo fire conflagration analysis, the method including actions of:
   initializing an area with macro fire conflagration characteristics that express propensity of parts of the area to accommodate ignition and/or movement of fire;
   performing a first Monte Carlo fire conflagration analysis for the area to simulate numerous randomly distributed ignitions and fire spread conditions using the macro fire conflagration characteristics to generate macro fire conflagration scores (MAFC scores) that summarize results of the simulated ignitions and fire spread for the parts of the area;
   initializing the area with notional structures and individually or collectively encoded site characteristics reflecting at least site vegetation, fireproof construction rating, and firefighting capabilities of organization(s) expected to respond to fires approaching the notional structures;
   performing a second Monte Carlo fire conflagration analysis to simulate numerous randomly distributed ignitions, fire spread conditions and resulting damage to the notional structures, including average annual losses to generate micro fire conflagration scores (MIFC scores) for that summarize the average annual losses;
   wherein the MAFC and the MIFC scores are useful for predicting average annual losses to a structure of interest at a site in the area.

2. The method of claim 1, further including applying a regression analysis to fit the MAFC scores and the MIFC scores to the average annual losses experienced by the notional structures.

3. The method of claim 2, further including fitting a macro coefficient to a second or higher order term of the MAFC scores and a micro coefficient to a first order term of the MIFC scores.

4. The method of claim 1, wherein calculation of the average annual losses during second Monte Carlo fire conflagration analysis is restricted to processing fire conflagration events of a higher severity.

5. The method of claim 1, further assigning the notional structures with individually or collectively encoded site characteristics for each of the notional structures reflecting proximity to fire hydrant.

6. The method of claim 1, further including:
using a Voronoi or other graph partitioning algorithm on at least one processor to group the parts into first regions that have shared propensities to accommodate ignition and/or movement based on the MAFC scores;
using a Voronoi or other graph partitioning algorithm on at least one processor to group the parts of the first regions into second regions based on the MIFC scores;
wherein the MAFC and the MIFC scores can be applied to a site based on its location within the first and second regions.

7. A tangible non-transitory computer readable storage media, including program instructions loaded into memory that, when executed on a plurality of processors cause the processors to implement a method of simulating of wildfire conflagration damage to structures assigned to regions within an area, including Monte Carlo fire conflagration analysis, the method including actions of:
initializing an area with macro fire conflagration characteristics that express propensity of parts of the area to accommodate ignition and/or movement of fire;
performing a first Monte Carlo fire conflagration analysis for the area to simulate numerous randomly distributed ignitions and fire spread conditions using the macro fire conflagration characteristics to generate macro fire conflagration scores (MAFC scores) that summarize results of the simulated ignitions and fire spread for the parts of the area;
initializing the area with notional structures and individually or collectively encoded site characteristics reflecting at least site vegetation, fireproof construction rating, and firefighting capabilities of organization(s) expected to respond to fires approaching the notional structures;
performing a second Monte Carlo fire conflagration analysis to simulate numerous randomly distributed ignitions, fire spread conditions and resulting damage to the notional structures, including average annual losses to generate micro fire conflagration scores (MIFC scores) for that summarize the average annual losses;
wherein the MAFC and the MIFC scores are useful for predicting average annual losses to a structure of interest at a site in the area.

8. The non-transitory computer readable storage media of claim 7, further including applying a regression analysis to fit the MAFC scores and the MIFC scores to the average annual losses experienced by the notional structures.

9. The non-transitory computer readable storage media of claim 8, further including fitting a macro coefficient to a second or higher order term of the MAFC scores and a micro coefficient to a first order term of the MIFC scores.

10. The non-transitory computer readable storage media of claim 7, wherein calculation of the average annual losses during second Monte Carlo fire conflagration analysis is restricted to processing fire conflagration events of a higher severity.

11. The non-transitory computer readable storage media of claim 7, further assigning the notional structures with individually or collectively encoded site characteristics for each of the notional structures reflecting proximity to fire hydrant.

12. The tangible non-transitory computer readable storage media of claim 7, further including:
using a Voronoi or other graph partitioning algorithm on at least one of the processors to group the parts into first regions that have shared propensities to accommodate ignition and/or movement based on the MAFC scores;
using a Voronoi or other graph partitioning algorithm on at least one of the processors to group the parts of the first regions into second regions based on the MIFC scores;
wherein the MAFC and the MIFC scores can be applied to a site based on its location within the first and second regions.

13. A system including one or more processors coupled to memory, the memory with instructions to perform simulating of wildfire conflagration damage to structures assigned to regions within an area, including Monte Carlo fire conflagration analysis, the instructions, when executed by the one or more processors, cause the system to perform actions including:
initializing an area with macro fire conflagration characteristics that express propensity of parts of the area to accommodate ignition and/or movement of fire;
performing a first Monte Carlo fire conflagration analysis for the area to simulate numerous randomly distributed ignitions and fire spread conditions using the macro fire conflagration characteristics to generate macro fire conflagration scores (MAFC scores) that summarize results of the simulated ignitions and fire spread for the parts of the area;
initializing the area with notional structures and individually or collectively encoded site characteristics reflecting at least site vegetation, fireproof construction rating, and firefighting capabilities of organization(s) expected to respond to fires approaching the notional structures;
performing a second Monte Carlo fire conflagration analysis to simulate numerous randomly distributed ignitions, fire spread conditions and resulting damage to the notional structures, including average annual losses to generate micro fire conflagration scores (MIFC scores) for that summarize the average annual losses;
wherein the MAFC and the MIFC scores are useful for predicting average annual losses to a structure of interest at a site in the area.

14. The system of claim 13, further including actions of applying a regression analysis to fit the MAFC scores and the MIFC scores to the average annual losses experienced by the notional structures.

15. The system of claim 14, further including actions of fitting a macro coefficient to a second or higher order term of the MAFC scores and a micro coefficient to a first order term of the MIFC scores.

16. The system of claim 13, wherein calculation of the average annual losses during second Monte Carlo fire conflagration analysis is restricted to processing fire conflagration events of a higher severity.

17. The system of claim 13, further actions of assigning the notional structures with individually or collectively encoded site characteristics for each of the notional structures reflecting proximity to fire hydrant.

18. The system of claim 13, further including:
using a Voronoi or other graph partitioning algorithm on at least one of the processors to group the parts into first regions that have shared propensities to accommodate ignition and/or movement based on the MAFC scores;
using a Voronoi or other graph partitioning algorithm on at least one of the processors to group the parts of the first regions into second regions based on the MIFC scores;

wherein the MAFC and the MIFC scores can be applied to a site based on its location within the first and second regions.

* * * * *